(12) United States Patent
Chen et al.

(10) Patent No.: US 10,830,940 B2
(45) Date of Patent: Nov. 10, 2020

(54) LIGHT GUIDE PLATE AND MANUFACTURING METHOD THEREOF, BACKLIGHT ASSEMBLY, AND DISPLAY ASSEMBLY

(71) Applicants: BOE Technology Group Co., Ltd., Beijing (CN); K-Tronics (Suzhou) Technology Co., Ltd., Jiangsu (CN)

(72) Inventors: Liri Chen, Beijing (CN); Qingen Zhou, Beijing (CN); Rongshun Zhang, Beijing (CN)

(73) Assignees: BOE TECHNOLOGY GROUP CO., LTD., Beijing (CN); K-TRONICS (SUZHOU) TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 16/193,370

(22) Filed: Nov. 16, 2018

(65) Prior Publication Data

US 2019/0265402 A1   Aug. 29, 2019

(30) Foreign Application Priority Data

Feb. 24, 2018   (CN) .......................... 2018 1 0157354

(51) Int. Cl.
*F21V 8/00*   (2006.01)

(52) U.S. Cl.
CPC .......... *G02B 6/0041* (2013.01); *G02B 6/0065* (2013.01); *G02B 6/0068* (2013.01)

(58) Field of Classification Search
CPC ... G02B 6/0041; G02B 6/0065; G02B 6/0068
(Continued)

(56) References Cited

U.S. PATENT DOCUMENTS

| | | | | |
|---|---|---|---|---|
| 2,551,622 A | * | 5/1951 | Mohr | G02B 6/0091 40/546 |
| 2005/0024849 A1 | * | 2/2005 | Parker | F21V 5/00 362/600 |

(Continued)

FOREIGN PATENT DOCUMENTS

| | | |
|---|---|---|
| CN | 202676941 U | 1/2013 |
| CN | 102981309 A | 3/2013 |

(Continued)

OTHER PUBLICATIONS

First Office Action dated Jul. 23, 2019 corresponding to Chinese application No. 201810157354.5.

*Primary Examiner* — Bryon T Gyllstrom
(74) *Attorney, Agent, or Firm* — Nath, Goldberg & Meyer; Joshua B. Goldberg

(57) ABSTRACT

The present disclosure provides a light guide plate and a manufacturing method thereof, a backlight assembly, and a display assembly. The light guide plate of the present disclosure includes: a light guide plate body; a first light outgoing surface formed on one surface of two opposite surfaces of the light guide plate body which have a largest area; a second light outgoing surface formed on the other surface of the two opposite surfaces of the light guide plate body which have the largest area; a light incoming surface formed on a side surface of the light guide plate body extending in a direction perpendicular to the first and the second outgoing surfaces; and a plurality of light diffusion structures formed on a plane inside the light guide plate.

17 Claims, 4 Drawing Sheets

(58) Field of Classification Search
USPC .......................................................... 362/612
See application file for complete search history.

(56) References Cited

U.S. PATENT DOCUMENTS

| | | | | |
|---|---|---|---|---|
| 2006/0083020 | A1* | 4/2006 | Tai | G02B 5/0242 362/558 |
| 2007/0081780 | A1* | 4/2007 | Scholl | G02B 6/0041 385/129 |
| 2011/0182055 | A1* | 7/2011 | Kanade | G02B 6/0041 362/84 |
| 2011/0199774 | A1* | 8/2011 | Shinohara | F21S 8/086 362/311.01 |
| 2011/0242146 | A1* | 10/2011 | Uchida | G02B 6/0041 345/690 |
| 2012/0127755 | A1* | 5/2012 | Shiau | G02B 6/0041 362/607 |
| 2013/0114291 | A1* | 5/2013 | Brick | G02B 6/0041 362/606 |
| 2014/0160796 | A1* | 6/2014 | He | G02B 6/0063 362/619 |
| 2014/0192553 | A1* | 7/2014 | Liu | G02B 6/0035 362/606 |
| 2016/0170122 | A1* | 6/2016 | Lee | G02B 6/0016 362/609 |

FOREIGN PATENT DOCUMENTS

| | | | |
|---|---|---|---|
| CN | 104360432 | A | 2/2015 |
| CN | 206892384 | U | 1/2018 |
| WO | 2007140345 | A2 | 12/2007 |

* cited by examiner

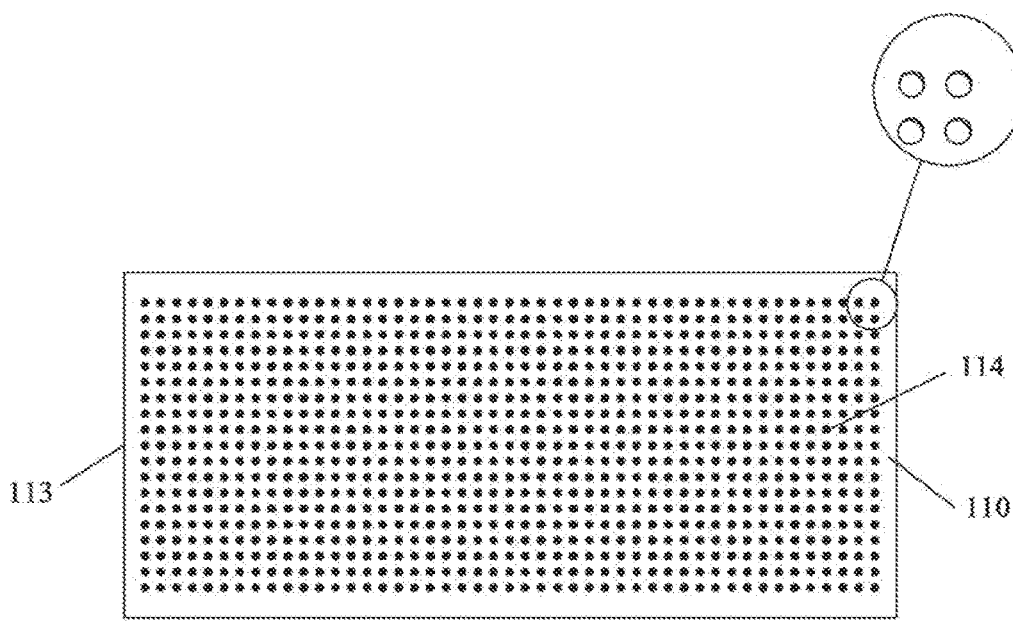

Fig.6

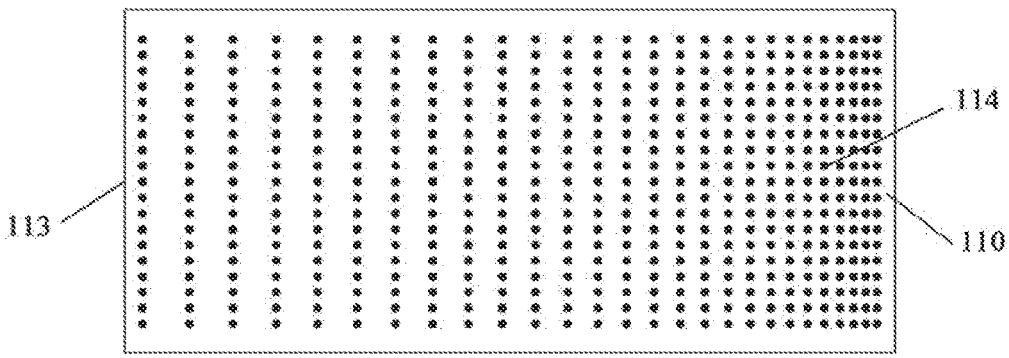

Fig.7

| prepare a light guide plate body such that the light guide plate body includes a first and second light outgoing surfaces respectively on two opposite surfaces of the light guide plate body which have a largest area, and a light incoming surface on a side surface of the light guide plate body extending in a direction perpendicular to the first and the second outgoing surfaces | — S1 |

| form a plurality of light diffusion structures on a plane inside the light guide plate body parallel to the first outgoing surface and the second outgoing surface by laser engraving | — S2 |

Fig.8

LIGHT GUIDE PLATE AND MANUFACTURING METHOD THEREOF, BACKLIGHT ASSEMBLY, AND DISPLAY ASSEMBLY

CROSS-REFERENCE TO RELATED APPLICATION

The present application claims priority to Chinese Patent Application No. 201810157354.5, filed on Feb. 24, 2018, the disclosure of which is hereby incorporated by reference in its entirety.

TECHNICAL FIELD

The present disclosure relates to the field of liquid crystal display technology, in particular, to a light guide plate and a manufacturing method thereof; a backlight assembly, and a display assembly.

BACKGROUND

A backlight is an important component of a liquid crystal display device. Among others, an edge type backlight is widely used. The edge type backlight includes a light guide plate and a LED light source. The LED light source is provided to face a light incoming surface of the light guide plate such that light emitted from the LED light source may enter into the light guide plate. After a series of reflections and refractions, the light entering into the light guide plate comes out of a light outgoing surface of the light guide plate so as to be used for the liquid crystal display device.

In the related art, since the light guide plate has a single-side light-emitting structure, the light-emitting angle thereof is just 180°, and can be applied only to a display device with a single-side display structure.

SUMMARY

The present disclosure provides a light guide plate which includes: a light guide plate body; a first light outgoing surface formed on one surface of two opposite surfaces of the light guide plate body which have a largest area; a second light outgoing surface formed on the other surface of the two opposite surfaces of the light guide plate body which have the largest area; a light incoming surface formed on a side surface of the light guide plate body extending in a direction perpendicular to the first and the second outgoing surfaces; and a plurality of light diffusion structures formed on a plane inside the light guide plate body.

In an embodiment, the plane is parallel to the first outgoing surface and/or the second outgoing surface.

In some embodiments, each of the plurality of light diffusion structures is formed as a spherical hollow structure or as a polyhedral hollow structure.

In some embodiments, a part of the plurality of light diffusion structures each is formed as a polyhedral hollow structure, and a remaining part of the plurality of light diffusion structures each is formed as a spherical hollow structure.

In some embodiments, the plurality of light diffusion structures are arranged in a rectangular pattern.

In some embodiments, the plurality of light diffusion structures are arranged in a concentric-circle pattern.

In some embodiments, the plurality of light diffusion structures are arranged in a wave-type pattern.

In some embodiments, distances between any two adjacent light diffusion structures among the plurality of light diffusion structures are identical.

In some embodiments, a distance between two adjacent light diffusion structures among the plurality of light diffusion structures is decreased gradually from a side near the light incoming surface to a side away from the light incoming surface.

In some embodiment, the light guide plate body is made of polymethylmethacrylate or glass.

The present disclosure further provides a method of manufacturing the above light guide plate, and the method includes: preparing the light guide plate body such that the light guide plate body includes the first light outgoing surface on the one surface of the two opposite surfaces of the light guide plate body which have the largest area and the second light outgoing surface on the other surface of the two opposite surfaces of the light guide plate body which have the largest area; and forming the plurality of light diffusion structures on the plane inside the light guide plate body parallel to the first and the second light outgoing surfaces.

In some embodiments, each of the plurality light diffusion structures is engraved as a spherical hollow structure by laser engraving.

The present disclosure further provides a backlight assembly which includes the above light guide plate and at least one LED light source which is provided to face the light incoming surface of the light guide plate body, and an optical axis of the at least one LED light source is perpendicular to the light incoming surface.

The present disclosure further provides a display assembly which includes the above backlight assembly, and further includes a first optical assembly and a first display panel which are provided to face the first light outgoing surface of the light guide plate body, and a second optical assembly and a second display panel which are provided to face the second light outgoing surface side of the light guide plate body.

BRIEF DESCRIPTION OF THE FIGURES

FIG. 6 is a schematic diagram of a light guide plate in which each of a plurality of light diffusion structures has a spherical hollow structure, according to an embodiment of the present disclosure;

FIG. 7 is a schematic diagram of a light guide plate in which a distance between two adjacent light diffusion structures is decreased gradually from a side near the light incoming surface to a side away from the light incoming surface, according to an embodiment of the present disclosure;

FIG. 8 is a flow chart of a method of manufacturing a light guide plate according to an embodiment of the present disclosure;

DETAILED DESCRIPTION

The present disclosure will be further described below in conjunction with the drawings.

Figure 1:
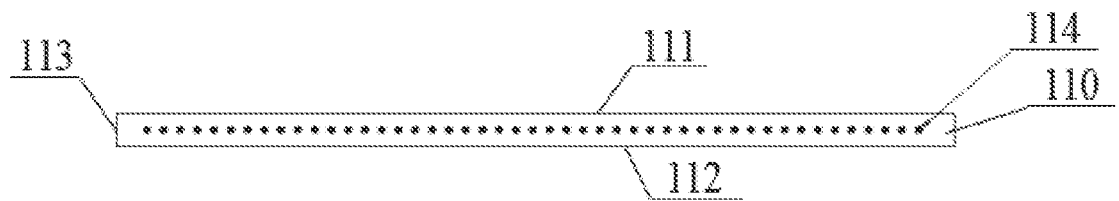
FIG. 1 is a front view of a light guide plate according to an embodiment of the present disclosure.

FIG. 1 is a front view of a light guide plate according to an embodiment of the present disclosure. As shown in FIG. 1, a light guide plate is provided. The light guide plate includes a light guide plate body 110, a first light outgoing surface 111, a second light outgoing surface 112, a light incoming surface 113, and a plurality of light diffusion structures 114. The first light outgoing surface 111 and the second light outgoing surface 112 are formed respectively on two opposite surfaces (i.e., an upper surface and a lower surface in FIG. 1) of the light guide plate body 110 which have a largest area. The light incoming surface 113 is formed on a side surface of the light guide plate body 110 which extends in a direction perpendicular to the first light outgoing surface 111 and the second light outgoing surface 112. Since both the upper surface and the lower surface of the light guide plate can emit light, the light-emitting angle of the light guide plate according to an embodiment of the present disclosure may be up to 360°, and may be applicable to a display device with a double-side display structure.

In an embodiment of the present disclosure, as shown in FIG. 1, the light guide plate body 110 has the plurality of light diffusion structures 114 provided therein. The plurality of light diffusion structures 114 are provided on a plane parallel to the first and the second light outgoing surfaces 111 and 112. Since the plurality of light diffusion structures 114 are provided inside the light guide plate body 110, light can be diffused by the plurality of light diffusion structures 114 when entering into the light guide plate body 110 via the light incoming surface 113, thereby reducing optical consumption of the light guide plate and improving optical utilization of the light guide plate. Each of the plurality of light diffusion structures 114 may be formed by any suitable process, such as laser engraving.

In an embodiment of the present disclosure, the plurality of light diffusion structures 114 may be provided on a plane inside the light guide plate body 110 which is equidistant from the first light outgoing surface 111 and the second light outgoing surface 112. In this case, the brightness of the first light outgoing surface 111 and that of the second light outgoing surface 112 are the same. The plurality of light diffusion structures 114 may be alternatively provided on a plane inside the light guide plate body 110 which is closer to either the first light outgoing surface 111 or the second light outgoing surface 112; in this case, one of the first light outgoing surface 111 and the second light outgoing surface 112 which is closer to the plurality of light diffusion structures 114 has a larger brightness. Accordingly, in the practice of manufacturing a light guide plate body 110, the position of the plane on which the plurality of light diffusion structures 114 are provided may be adjusted according to the requirements for the brightness of the first and the second light outgoing surfaces 111 and 112.

Figure 2:
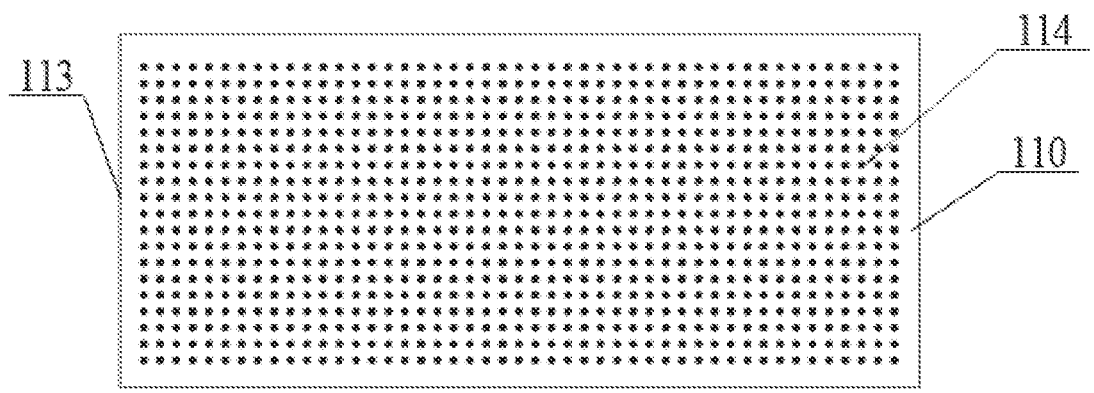
FIG. 2 is a top view of the light guide plate according to the embodiment of the present disclosure shown in FIG. 1, in which a plurality of light diffusion structures are arranged in a rectangular pattern.
Figure 3:
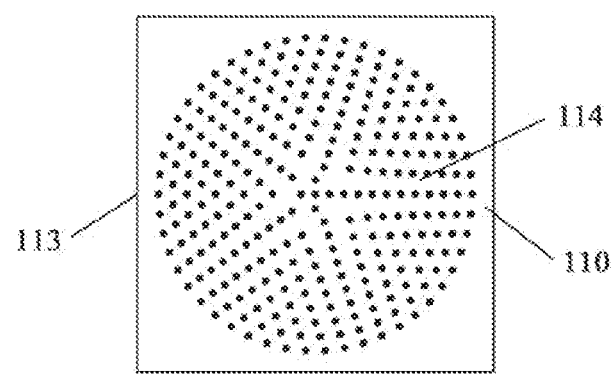
FIG. 3 is a schematic diagram of a light guide plate in which a plurality of light diffusion structures are arranged in a concentric-circle pattern, according to an embodiment of the present disclosure.
Figure 4:
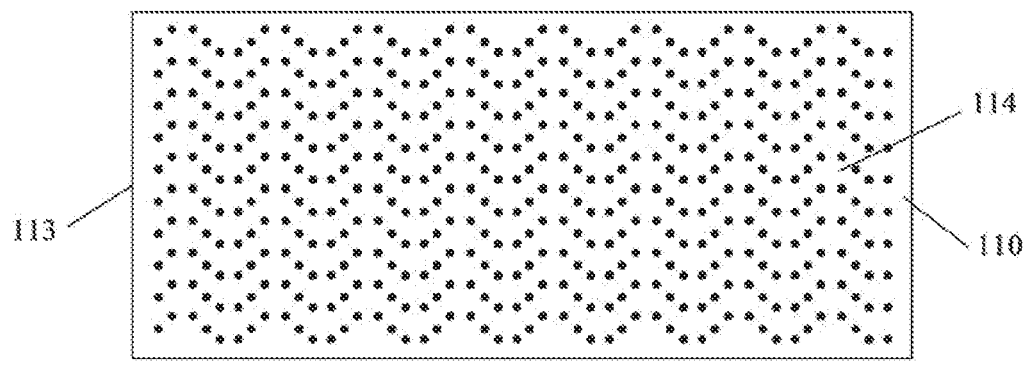
FIG. 4 is a schematic diagram of a light guide plate in which a plurality of light diffusion structures are arranged in a wave-type pattern, according to an embodiment of the present disclosure.

FIG. 2 is a top view of the light guide plate according to the embodiment of the present disclosure shown in FIG. 1. In the embodiment of the present disclosure, as shown in FIG. 2, distances between any two adjacent light diffusion structures 114 among the plurality of light diffusion structures 114 are identical, and the plurality of light diffusion structures 114 are arranged in a rectangular pattern. In addition, in an embodiment of the present disclosure, as shown in FIG. 3, the plurality of light diffusion structures 114 may be arranged in a concentric-circle pattern. In an embodiment of the present disclosure, as shown in FIG. 4, the plurality of light diffusion structures 114 may be arranged in a wave-type pattern.

Figure 5:
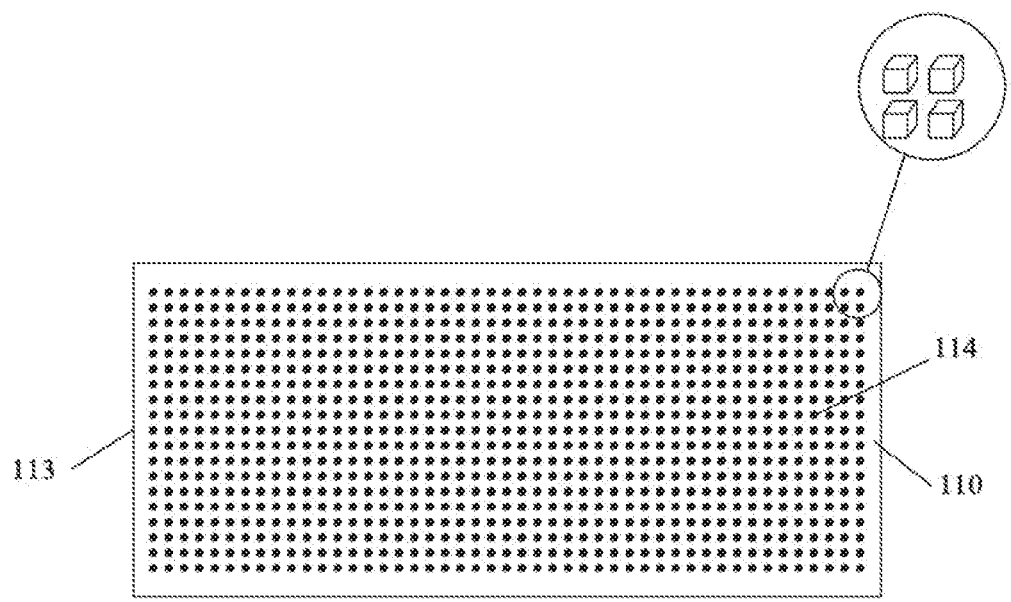
FIG. 5 is a schematic diagram of a light guide plate in which each of a plurality of light diffusion structures has a square hollow structure, according to an embodiment of the present disclosure.

In an embodiment of the present disclosure, each of the plurality of light diffusion structures 114 may have a polyhedral hollow structure, and the hollow structure may have a shape of an arbitrary polyhedron as long as light can be diffused. For example, as shown in FIG. 5, each of the plurality of light diffusion structures 114 has a square hollow structure.

In an embodiment of the present disclosure, as shown in FIG. 6, each of the plurality of light diffusion structures 114 may be formed as a spherical hollow structure. Owing to a good diffuse reflection effect of a spherical surface, the effect of diffusing light by the light guide plate of an embodiment of the present disclosure can be improved, thereby enhancing the brightness and a brightness uniformity of the first and the second light outgoing surfaces 111 and 112.

The present disclosure is not limited thereto. A part of the plurality of light diffusion structures 114 each may be formed as a spherical hollow structure and a remaining part of the plurality of light diffusion structures 114 each may be formed as a polyhedral hollow structure.

In an embodiment of the present disclosure, the distance between two adjacent light diffusion structures 114 may be determined according to an intensity of the light incident on the light incoming surface 113 of the light guide plate and the brightness of the first and the second light outgoing surfaces 111 and 112 required. For example, if the light incident on the light incoming surface 113 has a lower intensity while larger brightness of the first and the second light outgoing surfaces 111 and 112 is required, the distance between two adjacent light diffusion structures 114 may be decreased appropriately. On the contrary, if the light incident on the light incoming surface 113 has a higher intensity while smaller brightness of the first and the second light outgoing surfaces 111 and 112 is required, the distance between two adjacent light diffusion structures 114 may be increased appropriately.

In an embodiment of the present disclosure, as shown in FIG. 7, the distance between two adjacent light diffusion structures 114 may be decreased gradually, from a side near the light incoming surface 113 to a side away from the light incoming surface 113, on a plane inside the light guide plate body 110. Since the light intensity is reduced gradually from the side near the light incoming surface 113 to the side away from the light incoming surface 113 within the light guide plate body 110, the distance between two adjacent light diffusion structures 114 is made to be decreased gradually from the side near the light incoming surface 113 to the side away from the light incoming surface 113 so that the brightness of the first and the second light outgoing surfaces 111 and 112 may be uniform.

FIG. 8 is a flow chart of a method of manufacturing a light guide plate according to an embodiment of the present disclosure. As shown in FIG. 8, the method of manufacturing a light guide plate according to an embodiment of the present disclosure includes the following steps.

In step S1, the light guide plate body 110 is prepared, the first light outgoing surface 111 and the second light outgoing surface 112 are formed respectively on two opposite surfaces of the light guide plate body 110 which have the largest area, and the light incoming surface 113 is formed on a side surface of the light guide plate body 110 extending in a direction perpendicular to the first and the second outgoing surfaces 111 and 112.

In step S2, a plurality of light diffusion structures 114 are formed on a plane inside the light guide plate body 110 parallel to the first and the second outgoing surfaces 111 and 112.

In an embodiment of the present disclosure, since both of the two opposite surfaces of the light guide plate body which have the largest area can emit light, the light-emitting angle of the light guide plate according to an embodiment of the present disclosure may be up to 360°, and may be applicable to a display device with a double-side display structure.

In an embodiment of the present disclosure, since a plurality of light diffusion structures 114 are provided inside the light guide plate body 110, light can be diffused by the plurality of light diffusion structures 114 when entering into the light guide plate body 110 via the light incoming surface 113, thereby reducing the optical consumption of the light guide plate and improving the optical utilization of the light guide plate.

In an embodiment of the present disclosure, when the plurality of light diffusion structures 114 are manufactured, they may be formed on a plane inside the light guide plate body 110 being equidistant from the first light outgoing surface 111 and the second light outgoing surface 112. In this case, the brightness of the first and the second light outgoing surface 111 and 112 is the same.

In an embodiment of the present disclosure, when the light diffusion structures 114 are manufactured, they may be formed on a plane inside the light guide plate body 110 closer to either the first light outgoing surface 111 or the second light outgoing surface 112. In this case, one of the first light outgoing surface 111 and the second light outgoing surface 112 which is closer to the light diffusion structures 114 has a larger brightness.

With the method of manufacturing a light guide plate according to an embodiment of the present disclosure, a plurality of light diffusion structures 114 are formed on a plane inside the light guide plate body 110 parallel to the first light outgoing surface 111 and the second light outgoing surface 112, such that the light-emitting angle of the light guide plate may be up to 360°, and may be applicable to a display device with a double-side display structure.

In an embodiment of the present disclosure, the light guide plate body 110 may be made of for example, polymethylmethacrylate (PMMA) or glass. Since polymethylmethacrylate (PMMA) and glass have excellent optical characteristics, especially a high white-light transmittance, and they can withstand harsh external environmental changes without damage and have a lower cost, the production cost of the light guide plate may be reduced, and the service life of the light guide plate may be improved.

In an embodiment of the present disclosure, when being manufactured, each of the plurality of light diffusion structures 114 may be formed as a polyhedral hollow structure, and the hollow structure may have a shape of an arbitrary polyhedron as long as light can be diffused.

In an embodiment of the present disclosure, each of the plurality light diffusion structures 114 may be engraved as a spherical hollow structural inside the light guide plate body 110 by laser engraving. Since the laser engraving technique can engrave a predetermined shape at a predetermined position inside the glass without involving remaining of the glass, each light diffusion structure 114 can be manufactured accurately, and the success rate of manufacturing the light diffusion structure can be improved. Moreover, the laser engraving process has a low cost and need a sample operation, which can reduce the production cost of the light guide plate. In addition, a light diffusion structure 114 with a spherical hollow structure has a better diffuse reflection effect, that is to say, the effect of diffusing light by the light guide plate manufactured by the method of manufacturing a light guide plate according to an embodiment of the present disclosure can be improved, thereby enhancing the brightness and the brightness uniformity of the first and the second light outgoing surfaces 111 and 112.

Figure 9:
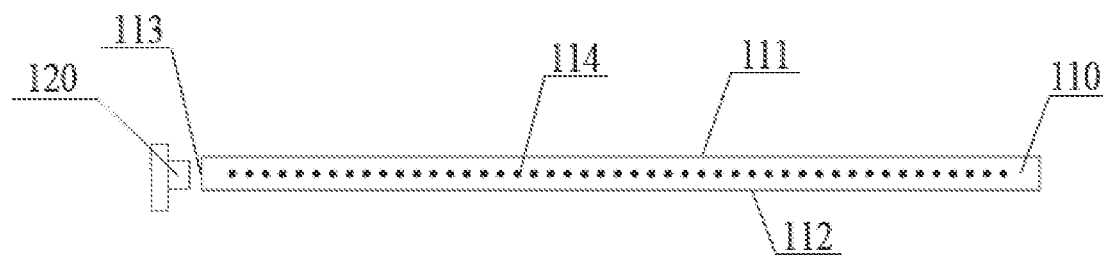
FIG. 9 is a schematic diagram of a structure of a backlight assembly according to an embodiment of the present disclosure.

FIG. 9 is a schematic diagram of a structure of a backlight assembly according to an embodiment of the present disclosure. As shown in FIG. 9, the present disclosure further provides a backlight assembly including the light guide plate according to an embodiment of the present disclosure and at least one LED light source 120 which is provided to face the light incoming surface 113 of the light guide plate body 110. An optical axis of the at least one LED light source 120 is perpendicular to the light incoming surface 113 so that light emitted from the at least one LED light source 120 may enter into the guide plate body 110 as much as possible. The number of the LED light source 120 may be set according to the desired brightness of the backlight assembly, that is to say, the number of the LED light source 120 may be increased so as to improve the brightness of the backlight assembly, or the number of the LED light source 120 may be decreased so as to decrease the brightness of the backlight assembly.

At this time, after being diffused by the plurality of light diffusion structures 114 inside the light guide plate body, the light entering into the guide plate body 110 via the light incoming surface 113 can come out of the first light outgoing surface 111 and the second light outgoing surface 112 (i.e., the upper surface and the lower surface in FIG. 9), respectively, thereby forming two surface light sources. Thus, the light-emitting angle of the light guide plate can be up to 360°.

Figure 10:
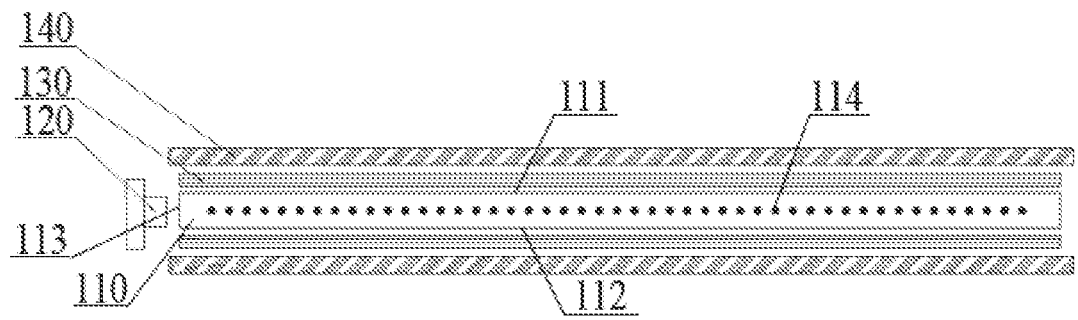
FIG. 10 is a schematic diagram of a structure of a display assembly according to an embodiment of the present disclosure.

FIG. 10 is a schematic diagram of a structure of a display assembly according to an embodiment of the present disclosure.

As shown in FIG. 10, the present disclosure further provides a display assembly including the backlight assembly according to an embodiment of the present disclosure as shown in FIG. 9. As shown in FIG. 10, an optical assembly 130 and a display panel 140 are sequentially provided at the first light outgoing surface 111 side of the light guide plate body, and an optical assembly 130 and a display panel 140 are provided at the second light outgoing surface 112 side of the light guide plate body, so that the display assembly can achieve the double-side display. The optical assembly 130 may be, for example, a lens set for guiding light to propagate, and the display panel 140 may be, for example, a LCD panel, an OLED panel, or the like.

In summary, in the embodiments of the present disclosure, the first light outgoing surface and the second light outgoing surface are formed on two opposite surfaces of the light guide plate body which have the largest area, respectively, and a plurality of light diffusion structures are provided on a plane inside the light guide plate body parallel to the first and the second light outgoing surfaces so that the light guide plate can emit light via the two light outgoing surfaces, thereby the light-emitting angle of the light guide plate can be up to 360°. Consequently, the light guide plate, the backlight assembly, and the display assembly in the present disclosure may be applicable to a display device with a double-side display structure.

The above contents are only exemplary descriptions of the present disclosure. An ordinary person skilled in the art will be appreciated that, various modifications may be made to the present disclosure without departing from the working principle of the present disclosure. These modifications should be also considered as the protective scope of the present disclosure.

What is claimed is:

1. A light guide plate, comprising:
 a light guide plate body;
 a first light outgoing surface formed on one surface of two opposite surfaces of the light guide plate body which have a largest area;
 a second light outgoing surface formed on the other surface of the two opposite surfaces of the light guide plate body which have the largest area;
 a light incoming surface formed on a side surface of the light guide plate body extending in a direction perpendicular to the first and the second outgoing surfaces; and
 a plurality of light diffusion structures formed on a plane inside the light guide plate body,
 wherein the plurality of light diffusion structures are uniformly arranged from a center in a concentric-circle pattern and each of the plurality of light diffusion structures is formed as a hollow structure.

2. The light guide plate of claim 1, wherein the plane is parallel to the first outgoing surface and/or the second outgoing surface.

3. The light guide plate of claim 1, wherein a portion of the plurality of light diffusion structures each is formed as a square hollow structure, and a remaining portion of the plurality of light diffusion structures each is formed as a ball-shaped hollow structure.

4. The light guide plate of claim 1, wherein distances between any two adjacent light diffusion structures among the plurality of light diffusion structures are identical.

5. The light guide plate of claim 1, wherein the light guide plate body is made of polymethylmethacrylate or glass.

6. A backlight assembly, comprising the light guide plate of claim 1 and at least one LED light source which is provided to face the light incoming surface of the light guide plate body,
 wherein, an optical axis of the at least one LED light source being perpendicular to the light incoming surface.

7. A display assembly comprising the backlight assembly of claim 6, wherein
 the display assembly further comprises a first optical assembly and a first display panel being provided to face the first light outgoing surface of the light guide plate body, and a second optical assembly and a second display panel being provided to face the second light outgoing surface of the light guide plate body.

8. The display assembly of claim 7, wherein the plane is parallel to the first light outgoing surface and/or the second light outgoing surface.

9. A method of manufacturing a light guide plate, the light guide plate comprising:

a light guide plate body;
 a first light outgoing surface formed on one surface of two opposite surfaces of the light guide plate body which have a largest area;
 a second light outgoing surface formed on the other surface of the two opposite surfaces of the light guide plate body which have the largest area;
 a light incoming surface formed on a side surface of the light guide plate body extending in a direction perpendicular to the first and the second outgoing surfaces; and
 a plurality of light diffusion structures formed on a plane inside the light guide plate body;
 the method comprising steps of:
 preparing the light guide plate body such that the light guide plate body comprises the first light outgoing surface on the one surface of the two opposite surfaces of the light guide plate body which have the largest area and the second light outgoing surface on the other surface of the two opposite surfaces of the light guide plate body which have the largest area; and
 forming the plurality of light diffusion structures on the plane inside the light guide plate body such that the plurality of light diffusion structures are uniformly arranged from a center in a concentric-circle pattern and each of the plurality of light diffusion structures is formed as a hollow structure.

10. The method of claim 9, wherein the plane is parallel to the first outgoing surface and/or the second outgoing surface.

11. The method of claim 9, wherein each of the plurality light diffusion structures is engraved as a ball-shaped or square hollow structure by laser engraving.

12. The method of claim 9, wherein distances between any two adjacent light diffusion structures among the plurality of light diffusion structures are identical.

13. A light guide plate, comprising:
 a light guide plate body;
 a first light outgoing surface formed on one surface of two opposite surfaces of the light guide plate body which have a largest area;
 a second light outgoing surface formed on the other surface of the two opposite surfaces of the light guide plate body which have the largest area;
 a light incoming surface formed on a side surface of the light guide plate body extending in a direction perpendicular to the first and the second light outgoing surfaces; and
 a plurality of light diffusion structures formed on a plane inside the light guide plate body,
 wherein the plurality of light diffusion structures are arranged in a wave-type pattern, which extends along in a direction perpendicular to the light incoming surface, and each of the plurality of light diffusion structures is formed as a hollow structure.

14. The light guide plate of claim 13, wherein the plane is parallel to the first light outgoing surface and/or the second light outgoing surface.

15. The light guide plate of claim 13, wherein a portion of the plurality of light diffusion structures each is formed as a square hollow structure, and a remaining portion of the plurality of light diffusion structures each is formed as a ball-shaped hollow structure.

16. The light guide plate of claim 13, wherein distances between any two adjacent light diffusion structures among the plurality of light diffusion structures are identical.

17. The light guide plate of claim 13, wherein the light guide plate body is made of polymethylmethacrylate or glass.

\* \* \* \* \*